6562X
Bryant & Hyett.
Railroad.
Patented Jun. 13, 1831.
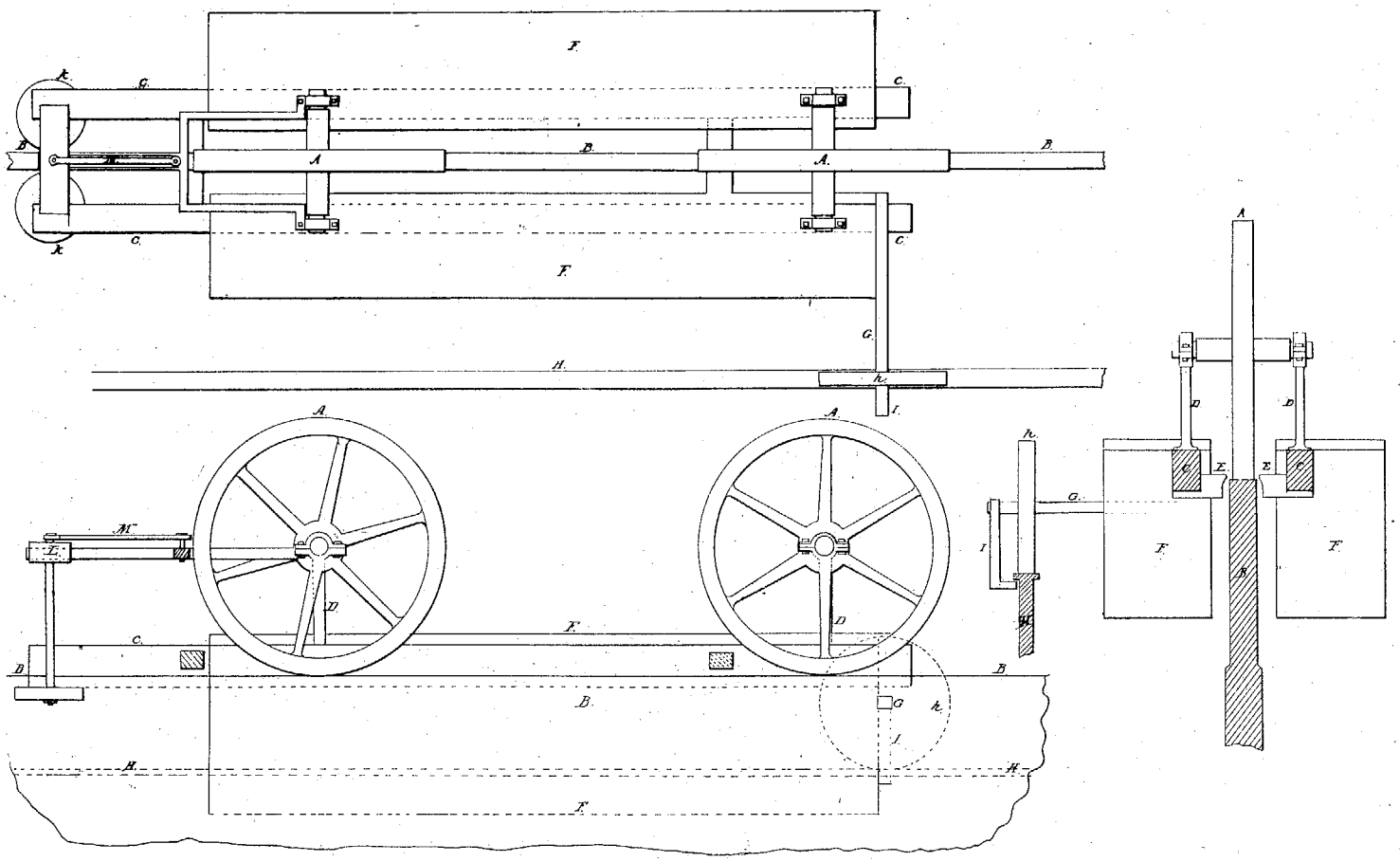
THE GRAPHIC CO. PHOTO-LITH. 39 & 41 PARK PLACE, N.Y.

June 13, 1831

William Bryant & Isaac Hiett.

6562X

Letters Patent.

The Schedule referred to in these Letters Patent, and making part of the same, containing a description in the words of the said William Bryant and Isaac Hiett, in themselves, of their improvement in the rail-way Carriage.

To all whom these presents shall come;

Be it known that we William Bryant and Isaac Hiett, of the County of Davidson and State of Tennesee, have in invented a new and useful carriage, to run on such rail-ways as have but one principal rail to bear the chief weight of the carriage and load, and a secondary rail to steady the carriage; and that the following is a full and exact description of our said invention.

The plan of the before named carriage is as follows Two wheels of about three feet in diameter, three inches wide on the rim, and six feet apart, from centre to centre, run on the principal rail. The wheel frame, consists of two bars of wood or iron, of length in proportion to the weight to be conveyed; placed one on each side of the principal rail. They extend, from a few inches back of the axle of the hind wheel forward about two feet in front of the fore wheel. These bars are framed together about one foot apart, and are suspended from the axles of the wheels by four rods of iron, which are attached to the bars at their lower ends, and at their upper ends to the boxes in which the axles run.

The bottom of the bars are about one inch and a half below the surface of the rail; to their under sides opposite each wheel are attached short pieces of wood or iron, termed guards

6562X guards, which project to within about a half an inch of the wheels on each side, they are intended to prevent the wheels going off the rail in time of loading, or when running if the guide should fail to direct them properly.

The body of the carriage is fastened upon, and borne by the bars of the wheel frame; it may be of a size & shape to suit the fancy or convenience of the owner.

To prevent jolting from irregularities of the railway, the bars of the wheel frame, or the body of the carriage, may be suspended by springs; and friction rollers may be used in the boxes of the axles to diminish their friction.

The carriage is kept steady, and its overturning is prevented, in the following manner.

A strong piece of iron, securely fastened to the hind part of the carriage, reaches out opposite to the secondary rail; This iron, is the axle of the third or steadying wheel, and has a journal on its outer end for the wheel to run on.

This wheel is about eighteen inches diameter, it runs on the before named axle; and bears on the secondary rail to keep the carriage steady.

A piece of iron attached to the axle of the third wheel, extends about a foot from the axle at right angles, it there bends and stands parallel with the axle to its end which is even with the outside of the wheel. This iron passes near the secondary rail on the edge opposite the wheel, and prevents the carriage overturning. The guiding of the carriage is effected in the following manner.

About two feet in front of the fore wheels, the guide wheels are placed; They are about ten inches in diameter, and placed horizontally on each side of the principal rail, within about one fourth of an inch of it, and near the top.

The axles of the guide wheels, are screwed into a piece of iron about one foot in length near its ends; This piece is placed

6562X placed crosswise of the rail about one foot above it, another piece of iron attached to the middle of this, passes back to within an inch of the fore wheel; it there forks, and passes on each side of the wheel, and is attached at the ends to the boxes of the axle, or to the axle near its ends, or to the suspension rods near the boxes; this iron is termed the guide.

Across the fore end of the bar is fixed a piece of wood or iron termed the guide rest; through the middle of this piece is a horizontal mortise or slit, and the guide iron near the fore end passes through it. The design of the rest, is to keep the guide whirls always at the same hight on the rail; the guide can move in the slit freely to either side, to permit the guide whirls to follow the course of the rail. By this arrangement the guide whirls are directed by the rail, the fore wheel by the guide, and the hind wheel is attached to the bars and body of the carriage in such a manner, as to make it track, or follow, directly after the fore wheel; consequently the wheels of the carriage are kept properly on the rail, without the assistance of grooves, flanges or ledges, on either the wheels or rail.

The fore wheel is kept at its proper place by a rod of iron which has a hole at each end, and is attached at one end, by a bolt or pin through the hole, to the guide near the fork, and at the other end to the rest in the same manner. The rod being moveable on the pins through ~~through~~ its ends, permits the wheel to wind or turn to either side; but prevents moving backward or forward.

The carriage may be propelled by any of the powers commonly used for such purposes, or by hand. If it is moved by hand, a whirl about eighteen inches in diameter, is placed in the carriage so as to be [illegible] turned with a crank; a band on this whirl, gives motion to the fore wheel by [illegible]

6562X

Sp.

driving a wheel on its axle of about six inches diameter; or instead of the wheels and trucks before named, bag wheels may be used.

Witnesses

Wm Carroll — Wm Bryant

Geo. Alex Porter — Lorne Hill

Jyh.

1078 n.s.